A. B. HURD.
Tire Tightener.
No. 102,008.
Patented April 19, 1870.
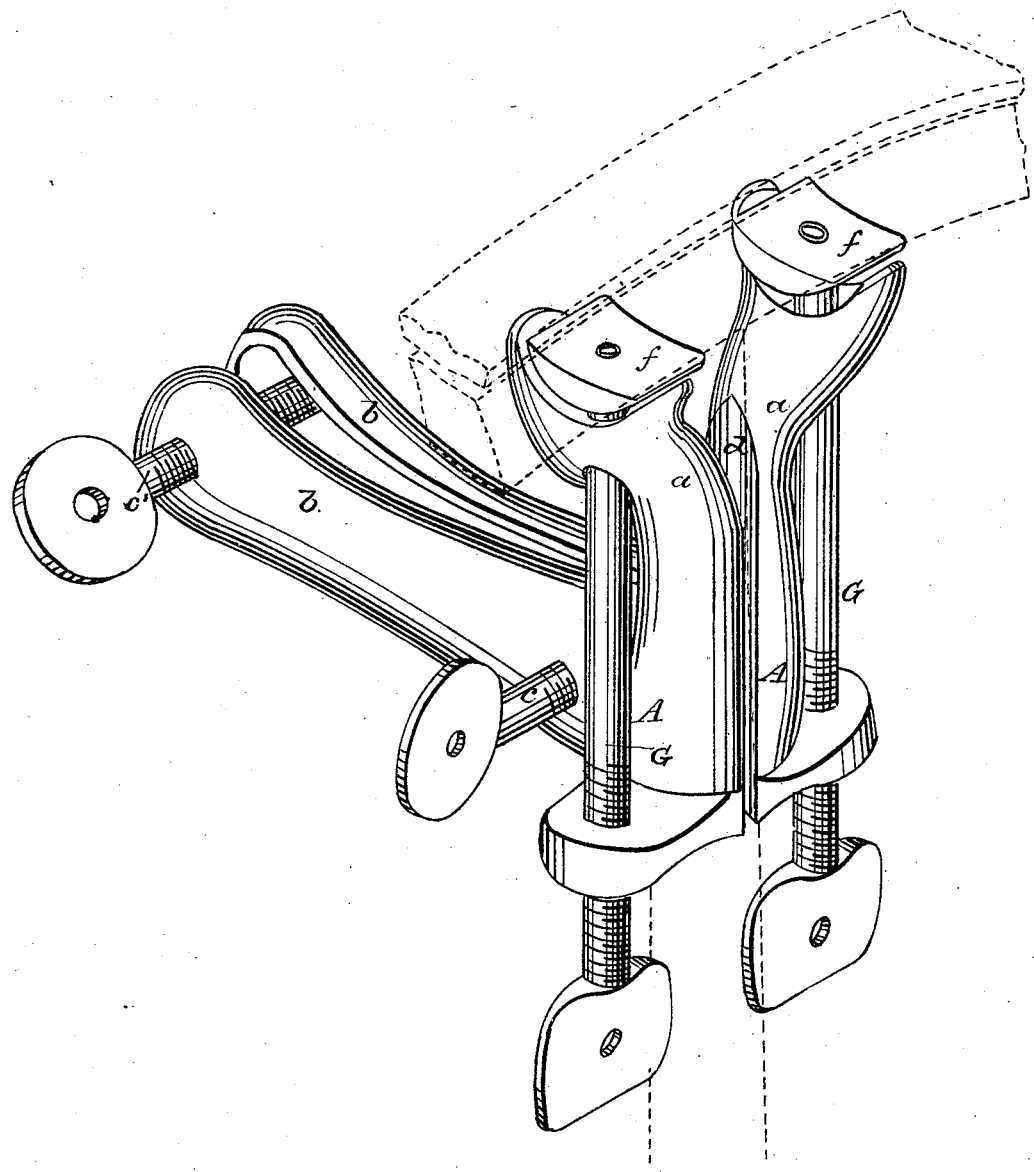

UNITED STATES PATENT OFFICE.

ARTEMAS BODMAN HURD, OF WATKINS, NEW YORK.

IMPROVEMENT IN WAGON-TIRE TIGHTENERS.

Specification forming part of Letters Patent No. 102,008, dated April 19, 1870.

*To all whom it may concern:*

Be it known that I, ARTEMAS BODMAN HURD, of Watkins, in the county of Schuyler and State of New York, have invented a certain new and useful Improvement in Tightening Tires on Wagon and other Wheels, of which the following is a specification:

My invention consists in expanding the rim of the wheel outward to meet the tire by means of a device of peculiar construction applied to the spokes, as hereinafter described.

The drawing represents a perspective view of the device, with a section of the wheel indicated in dotted lines. A A are two jaws, made preferably of cast-iron. These jaws are composed of vertical arms $a\ a$, which clasp the spoke between them, and horizontal shanks $b\ b$, which serve as the attachment of two screws, $c\ c'$, that serve to produce the clamping or tightening of the device in place on the spokes. The inner screw $c$ screws through both parts, while $c'$ simply passes through one and rests against the other. The vertical portions of the jaws have an interior groove, $d$, to receive the spokes, and they also have upright screws G G, with bearing-blocks $f\ f$, which receive the rim or felly of the wheel when the power is applied.

Any equivalent of these screws, such as cams, levers, or wedges, may be employed.

The operation is as follows: The jaws are placed upon one of the spokes, so as to embrace it at the proper position, and are clamped firmly thereto, by first turning up screw $c$, to "set" the parts, and then turning up screw $c'$ to produce an equal bearing upon the spoke and prevent marring, which might be produced by unequal strain. When the device is firmly clamped in place power is applied to screws G G, which set bearings $f\ f$ close up under the wheel-rim, which rests thereon, and consequently expand the latter firmly out against the tire.

When the rim is properly expanded, a washer, or thickness of leather or other suitable material, is inserted around the tenon of the spoke, between the shoulder and rim, and the device is then removed and applied to another spoke in the same manner.

The application to two or three spokes is generally sufficient.

By this means I reverse the process of setting tires, by expanding the rim outward against the tire, instead of compressing or shrinking the tire around the rim. Thus, if the tire is not exactly fitted, it can be made to fit without removal, and without cutting and welding the tire, to make it smaller. Where this is practised, there is much danger of breakage of the tire, as the heat involved in welding burns the iron, thus spoiling its texture and making it brittle.

In new work the rims frequently shrink from the tires, and the removal of the latter to cut down, re-weld, and shrink in place again, not only involves much labor and loss of time, but mars the paint and injures the wood-work generally.

I obviate all difficulty of this kind.

My improvement also serves a very important purpose, for general use, by all persons who own a wagon or carriage of any kind, from its facility of application at any time or place, saving the time of going to a shop and the services of a blacksmith.

Any person with one of these devices can tighten his tires himself, without cutting or removing the wheel from the axle. He can also give any desired dish to the wheel by applying sufficient pressure.

By thus avoiding the removal of the tire from the wheel I avoid the making of new bolt-holes in the rim or the enlarging of old ones, which is necessary where the tire is removed and made smaller by cutting and welding. I thus preserve the full strength of the rim under all circumstances.

Another advantage resulting from my invention is the interposition of the washer-packings between the shoulder of the spokes and the rim, which deaden the sound and give a degree of elasticity.

What I claim is—

1. The jaws or clamps A A, for attaching to the spokes under the rim, and expanding-screws G G, or equivalents, resting under the rim on opposite sides of the spoke, operating together as described, leaving a washer-space between the shoulder of the spoke and rim, substantially as herein shown and set forth.

2. The construction and arrangement of the expanding device, consisting of the jaws A A, clamping-screws C C, and expanding-screws G G, with bearing-blocks $ff$, the whole operating in the manner and for the purpose specified.

In witness whereof I have hereunto signed my name in the presence of two subscribing witnesses.

ARTEMAS BODMAN HURD.

Witnesses:
WM. HAUSE,
GEO. W. DRAKE.